United States Patent
André-Jönsson et al.

(10) Patent No.: US 9,307,566 B2
(45) Date of Patent: Apr. 5, 2016

(54) METHOD AND ARRANGEMENT FOR REDIRECTION OF TERMINAL

(75) Inventors: Henrik André-Jönsson, Linköping (SE); Rasmus Axén, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 60 days.

(21) Appl. No.: 13/981,003

(22) PCT Filed: Jan. 28, 2011

(86) PCT No.: PCT/EP2011/051242
§ 371 (c)(1),
(2), (4) Date: Jul. 22, 2013

(87) PCT Pub. No.: WO2012/100837
PCT Pub. Date: Aug. 2, 2012

(65) Prior Publication Data
US 2013/0315207 A1 Nov. 28, 2013

(51) Int. Cl.
*H04W 76/02* (2009.01)
*H04W 36/00* (2009.01)

(52) U.S. Cl.
CPC ........ *H04W 76/027* (2013.01); *H04W 36/0022* (2013.01); *H04W 36/0072* (2013.01)

(58) Field of Classification Search
CPC .................... H04W 36/0022; H04W 36/0072; H04W 76/027
See application file for complete search history.

(56) References Cited

U.S. PATENT DOCUMENTS

| | | | |
|---|---|---|---|
| 2010/0325267 A1 | 12/2010 | Mishra et al. | |
| 2011/0149907 A1* | 6/2011 | Olsson et al. | 370/331 |
| 2012/0289230 A1* | 11/2012 | Uno et al. | 455/435.2 |

FOREIGN PATENT DOCUMENTS

| | | |
|---|---|---|
| EP | 2211578 A1 | 7/2010 |
| WO | 2010105222 A1 | 9/2010 |

OTHER PUBLICATIONS

3rd Generation Partnership Project. 3GPP TS 23.272 V9.5.0 (Sep. 2010). 3rd Generation Partnership Project;Technical Specification Group Services and System Aspects;Circuit Switched (CS) fallback in Evolved Packet System (EPS); Stage 2 (Release 9). Sep. 2010, pp. 1-72.

3rd Generation Partnership Project. "CSFB with Release with Redirection to UMTS and deferred SIB reading." 3GPP TSG SA WG2 Meeting #82, S2-105757, Nov. 15-19, 2010, pp. 1-8, Jacksonville, Florida, USA.

(Continued)

*Primary Examiner* — Ayaz Sheikh
*Assistant Examiner* — Debebe Asefa
(74) *Attorney, Agent, or Firm* — Murphy, Bilak & Homiller, PLLC

(57) ABSTRACT

Methods and arrangements for handling shortcomings when a wireless user terminal (200), currently using a first connection (2:1) with a first network node (202), is redirected to a second connection in a release-with-redirect process. The connection first network node sends a first redirect message (2:2) to the terminal with an instruction to attach to the second connection. The terminal then sends a message (2:5) to the first network node which comprises a failure indication indicating that the terminal has made a failed attempt (2:3) to attach to the second connection. The first network node then identifies (2:6) a cause for the failed attempt by using the failure indication. The first network node also performs at least one of: sending (2:7) a second redirect message to the terminal based on the identified cause, and providing (2:9) the identified cause to a network management function, to enable adaptation of the release-with-redirect process.

25 Claims, 3 Drawing Sheets

(56) References Cited

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification", 3GPP TS 36.331 V9.4.0, Sep. 2010, 1-252.

3GPP, "3rd Generation Partnership Project; Technical Specification Group Services and System Aspects; Circuit Switched (CS) fallback in Evolved Packet System (EPS); Stage 2 (Release 9)", 3GPP TS 23.272 V9.3.0, Mar. 2010, 1-66.

* cited by examiner

METHOD AND ARRANGEMENT FOR REDIRECTION OF TERMINAL

TECHNICAL FIELD

The invention relates generally to a method and arrangement for handling shortcomings when a user terminal is redirected from one wireless connection to another.

BACKGROUND

Wireless user terminals of today are commonly capable of using more than one access technology for connecting to different types of communication networks and access nodes, i.e. base stations. For example, a user terminal may be capable of using both packet-switched (PS) connections and circuit-switched (CS) connections for different communication services. A circuit-switched connection providing a "stable" bandwidth is deemed suitable for voice services requiring real-time communication, while a packet-switched connection with more fluctuating bandwidth can be used for less real-time oriented services such as Internet browsing, messaging, streaming and file downloadings.

When a user terminal is served by a packet-switched connection of a first network and at some point requires a circuit-switched connection of a second network, e.g. when a service is activated that is better suited for circuit-switched communication such as an incoming or outgoing voice call, the terminal needs to change from the packet-switched connection to a circuit-switched connection, commonly referred to as "CS Fallback". In this case, the first network may be a Long Term Evolution (LTE) network and the second network may be a GSM or WCDMA network. This switch of connection can be executed in different ways, e.g. as specified in the Third Generation Partnership Project (3GPP).

One option is that the first network of the current packet-switched connection executes a regular handover of the terminal to a circuit-switched second network, which typically involves evaluation of a plurality of potential target cells in the new network, e.g. based on signal measurements, channel availability, etc., to determine which cell can best serve the terminal in the second network. However, a regular handover to a new network can be quite time-consuming due to the preparations required before the new circuit-switched connection is ready for use, and there is a substantial risk that the user(s) involved will find the wait frustrating and may even relinquish and end the service before any communication starts.

Another option is the somewhat faster process known as "release with redirect", i.e. the first network simply releases the terminal from its currently used packet-switched connection and instructs the terminal to use a preselected circuit-switched connection in the second network. In practice, a base station in the first network sends a redirect message instructing the terminal to tune to a given frequency and/or channel of the preselected circuit-switched connection and try to establish the new connection with a nearby base station in the second network, commonly referred to as "attach". The redirect message may also include various system information such as transmission schemes and communication parameters, sometimes referred to as Network Assisted Cell Change (NACC) information, for the terminal to use when attaching to the new connection.

However, since the new connection is preselected and has not been evaluated as suitable in this particular instance, there is a significant risk that the terminal for some reason fails to establish the new connection in the second network according to the redirect message, e.g. due to unfavorable radio conditions, no admission granted, or use of invalid system information.

A release-with-redirect process is illustrated in FIG. 1 where a wireless user terminal "T" currently using a first connection with "network 1", receives a redirect message in a first action 1:1, directing the terminal to switch to a preselected second connection in "network 2", e.g. after network 1 has detected a need for a new connection such as a CS connection for a forthcoming voice call. Terminal T then accordingly makes an attach attempt to a given base station in network 2, in an action 1:2, which for some reason fails.

Having failed the attachment to network 2, terminal T is forced to return to network 1 by sending a regular connection request to a base station in network 1, in an action 1:3, which may typically be the base station the terminal was connected to before attempting the new connection, or it may be another base station, e.g. if the terminal has moved to another location. At that point, the contacted base station in the first network will treat the terminal as any terminal requesting access, not being aware that the terminal has just failed to connect to the second network.

As a result, assuming that a circuit-switched connection is still needed, the base station in the first network may once again instruct the terminal to attempt the same preselected circuit-switched connection in another redirect message. In FIG. 1, network 1 thus sends the same redirect message once again after detecting that terminal T needs a new connection, in an action 1:4, i.e. directing the terminal to the same connection to network 2 as in action 1:1. The terminal will then most likely fail once again to attach, in an action 1:5, and so forth.

It is thus a problem that a terminal may repeatedly fail to attach to a new connection when needed in a predefined release-with-redirect process according to conventional solutions, and that any service requiring the new connection cannot be executed. Thus, the release-with-redirect process is predefined in the sense that the new connection is selected by default. A problem is also that the "blind" redirect process described above, i.e. without evaluation of the current actual connection conditions, is not very reliable to succeed and can cause significant delays and undue messaging over the air with the terminal. Further problems may persist in that the operator of either network cannot easily identify any problems and shortcomings in the release-with-direct process that may be the cause of the above attach failures.

SUMMARY

It is an object of the invention to address at least some of the problems and shortcomings outlined above. It is also an object to enable an improved process for redirecting user terminals from a first wireless connection to a second wireless connection. It is possible to achieve these objects and others by using a method and an arrangement as defined in the attached independent claims.

According to one aspect, a method is provided in a first network node for handling shortcomings when a wireless user terminal using a first connection is redirected to a second connection in a release-with-redirect process. In this method, the first network node sends a first redirect message to the terminal with an instruction to attach to the second connection, e.g. according to regular procedures. At some point after the first redirect message, a message is received from the terminal which comprises a failure indication effectively indicating that the terminal has made a failed attempt to attach to the second connection. The first network node then identifies a cause for the failed attempt to attach to the second connection, by using the failure indication. The first network node also performs at least one of: sending a second redirect message to the terminal based on the identified cause, and providing the identified cause to a network management function, to enable adaptation of the release-with-direct process.

According to another aspect, an arrangement is provided in a first network node configured to handle shortcomings when a wireless user terminal using a first connection is redirected to a second connection in a release-with-redirect process. The network node arrangement comprises a redirecting unit adapted to send a first redirect message to the terminal with an instruction to attach to the second connection, and a receiving unit adapted to receive a message from the terminal with a failure indication. The arrangement in the network node also comprises an identifying unit adapted to identify a cause for a failed attempt made by the terminal to attach to the second connection, by using the failure indication, and a providing unit adapted to provide the identified cause to a network management function, to enable adaptation of the release-with-redirect process.

According to another aspect, a method is provided in a user terminal, currently using a first connection to a first network node, for handling shortcomings when being redirected to a second connection in a release-with-redirect process. In this method, the terminal receives a first redirect message from the first network node with an instruction to attach to the second connection, and makes an attempt to attach to the second connection according to the instruction wherein the attach attempt fails. The terminal then determines a cause for the failed attach attempt and sends a message to a network of the first connection, which message has a failure indication that can be used to identify the cause for the failed attach attempt.

According to another aspect, an arrangement is provided in a user terminal, currently using a first connection to a first network node, for handling shortcomings when being redirected to a second connection in a release-with-redirect process. The user terminal arrangement comprises a receiving unit adapted to receive a first redirect message from the first network node with an instruction to attach to the second connection, and an attach unit adapted to make an attempt to attach to the second connection wherein the attach attempt fails. The arrangement in the user terminal also comprises a determining unit adapted to determine a cause for the failed attach attempt, and a sending unit adapted to send a message to a network of the first connection with a failure indication that can be used to identify the cause for the failed attach attempt.

By implementing any of the above aspects, it is possible to adapt and hopefully improve the release-with-redirect process on the basis of failed attach attempts made by wireless user terminals, and to make more apt redirect instructions so as to increase the chances of successful attach attempts for such wireless user terminals.

The above methods and arrangements may be configured and implemented according to different optional embodiments. In one possible embodiment, the message with a failure indication sent from the terminal to the first network node includes information indicating that the cause is related to at least one of: 1) the terminal could not properly attach to the second connection using system information in the first redirect message, 2) the terminal could not properly attach to the second connection using system information provided by the second connection, 3) system information in the first redirect message was not valid, 4) the terminal was not admitted to the second connection, and 5) the terminal has not received any response over the second connection. The first network node may poll the terminal in response to the failure indication, to obtain the cause from the terminal.

In further possible embodiments, the first network node provides the identified cause to the network management function to enable at least one of: 1) examining distribution of system information from a network of the second connection to a network of the first connection, 2) examining availability of a cell of the second connection, and 3) examining configurations of one or more cells affecting the second connection.

The second redirect message may suggest a new cell of a third connection different from a cell of the second connection suggested by the first redirect message. Further, the message with a failure indication may be conveyed to the first network node in a connection request from the terminal. Also, the terminal may send the message with a failure indication to the first network node or to another node in the network of the first connection.

Further possible features and benefits of this solution will become apparent from the detailed description below.

BRIEF DESCRIPTION OF DRAWINGS

The invention will now be described in more detail by means of exemplary embodiments and with reference to the accompanying drawings, in which.

DETAILED DESCRIPTION

Figure 1:
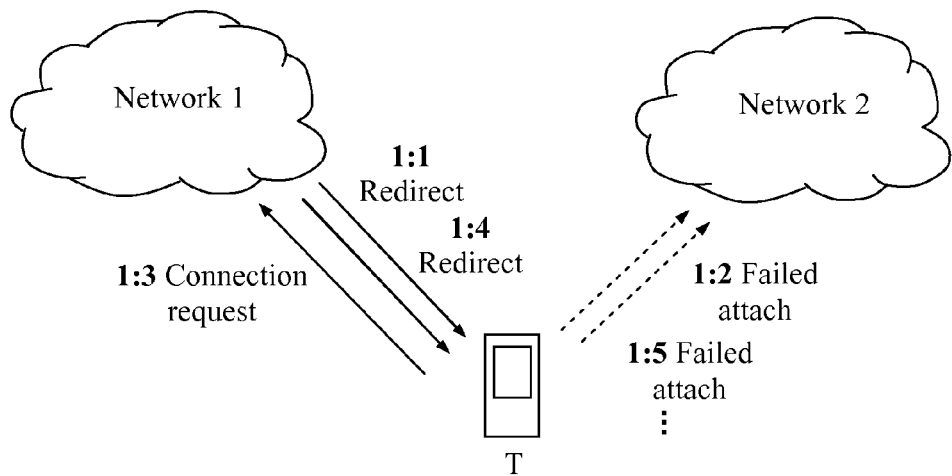
FIG. 1 is an overview of a communication scenario for a conventional release-with-redirect process, according to the prior art.

Briefly described, a solution is provided to enable adaptation and improvement of the release-with-redirect process when a wireless user terminal is redirected from one connection to another, i.e. without using a regular handover with evaluation of potential target cells and of the current actual connection conditions for selecting the best cell and connection. In the release-with-redirect process, the terminal first receives a first redirect message from a first network node of the current connection, typically a base station, with an instruction to attach to the new connection, which could either be a connection with another network than that of the former connection or a different connection with the same network. System information, e.g. NACC information, may be included in the first redirect message which is intended to be useful when attaching to the new connection. Otherwise, the terminal may obtain and use any necessary system information provided by the second connection e.g. as broadcasted over a cell of the second connection.

In this solution, the terminal informs the network of its former connection that an attempt to attach to the new connection has failed, by sending a message containing a failure indication, e.g. to the first network node or to another node in that network. This failure indication may be a more or less explicit statement of a presumed cause for the attach failure, which may be represented by a corresponding code or the like, or just an indication that the attach attempt has failed. In the latter case, the cause for the failed attempt can be obtained from the terminal in a following dialogue such as a polling process, to be described below. It is thus assumed that the terminal has a logic function capable of "determining", i.e. at least assuming or deducing, a cause for the failed attach attempt, which may be done in any suitable manner without departing from the invention.

In this description, the term "cause" should be understood broadly as a factor, aspect or event that presumably has impacted the failure of the attach attempt. By way of example, the terminal may detector deduce that the cause for failed attach attempt is, at least potentially, related to at least one of: 1) the terminal could not properly attach to the second connection using system information in the first redirect message, 2) the terminal could not properly attach to the second connection using system information provided by the second connection, 3) system information in the first redirect message was not valid, 4) the terminal was not admitted to the second connection, and 5) the terminal has not received any response over the second connection. Other causes for failed attach attempt are also possible within this solution. The terminal can thus either explicitly indicate this cause directly in a message to the network, e.g. a connection request message, or provide the cause in a following poll process with the network.

Having obtained the cause for the failed attach attempt form the terminal, the network is able to use this information with advantage in different ways. A "short-term" usage is that the network node having received the failure indication sends a new modified redirect message to the terminal based on the identified cause, which is hopefully more useful and likely to result in a successful attach for the terminal.

Another more "long-term" usage is to provide the identified cause to a "network management function" to enable adaptation of the release-with-redirect process. Adaptation of this process may include various actions for improving or "tuning" different parameters and configurations of the network, which can be performed based on similar fault reports received over time from multiple wireless terminals having also failed to attach to a new connection according to a redirect instruction.

This adaption may, without limitation to the invention, involve at least one of: 1) examining distribution of system information from a network of the second connection to a network of the first connection, 2) examining availability of a cell of the second connection, and 3) examining configurations of one or more cells affecting or impacting the second connection. The actual details of the adaptation work is however somewhat outside the scope of this solution. The network management function may reside in a central Operation and Maintenance (O&M) node or in the receiving network node.

An example of how this solution can be used for a wireless user terminal will now be described with reference to the signalling diagram in FIG. 2. In this example, the terminal 200 is initially using a first connection to a first node 202 of a serving network, as illustrated by an action 2:1. The first connection may be a PS connection according to LTE, as in the situation described in the background above.

At some point, the network node 202 decides that the terminal 200 should be redirected to another and second connection by means of a release-with-direct process, e.g. when the terminal activates a service or application that needs a different type of access than the current connection can provide. The second connection may be a CS connection according to GSM or WCDMA, as in the situation described in the background above. There may be other reasons for deciding to redirect the terminal to another connection, e.g. related to current radio conditions or cell load, and the invention is not limited to any particular reason for employing the release-with-redirect process. Basically, the new connection is presumably better in some respect than the first connection for the terminal or the network(s) involved, or both.

The first network node 202 then accordingly sends a first redirect message to terminal 200, in an action 2.2, with an instruction to attach to the second connection, i.e. to a second node 204 which may belong to another network or to the same one as that of network node 202. According to regular procedures, the terminal 200 is configured to follow the instruction and attach to node 204, and an attach attempt is illustrated as a dashed arrow in a next action 2:3, which however fails for whatever reason. Having failed the attach attempt, the terminal 200 determines, e.g. by knowing, assuming or deducing, a cause for the failed attempt in a following action 2:4, which could e.g. be one or more of the exemplifying failure causes 1)-5) above.

Terminal 200 then sends a message to the first network node 202, in a next action 2:5, the message having a failure indication basically informing the network on the failed attach attempt. The failure indication can be used by network node 202 to identify the cause for the failed attempt. In this example, the message is a modified regular connection request, in some systems referred to as "RRC Connection Request", in which the failure indication has been inserted, where RRC stands for Radio Resource Control.

As mentioned above, the failure indication may be a statement of the above-determined cause for the attach failure, or just a notification indicating that the attach attempt has failed. In practice, depending on the implementation, this failure indication may be provided as a parameter called "AccessErrorCause" and some exemplifying failure indications could comprise one or more of: "TargetNotFound" indicating failure cause 5) above, "IncompatibleSIBInfo" indicating failure cause 3) above and "AdmissionReject" indicating failure cause 4) above. In the second example above, SIB refers to "System Information Block".

The first network node 202 then identifies the cause for the failed attempt in a further action 2:6, which is straightforward if it was explicitly stated in the received failure indication e.g. as exemplified above, possibly in the form of a corresponding code or the like. If the failure indication was just a notification of failed attach attempt without further specification, network node 202 will obtain the cause for the failed attempt from the terminal in a separate dialogue such as a polling process, as illustrated by a dashed arrow in an action 2:6a.

Having somehow identified the failure cause, network node 202 may be able to revise the former redirect instruction of action 2:2 on the basis of this cause, and possibly also on the basis of other failed attach attempts of other terminals in the past, to come up with a better connection that the terminal 200 will be able to attach to successfully. As a result, node 202 accordingly sends a modified and hopefully improved second redirect message to the terminal, in a further action 2:7.

For example, it may be deduced that the previously suggested node 204 could not communicate properly with the terminal over the second connection, e.g. due to unfavorable radio conditions or congestion in a cell served by node 204. In that case, another frequency, cell and/or node may be selected for a new third connection. If it can be assumed that system information presented in the first redirect message was invalid, this system information can be omitted in the second redirect message such that the terminal will read any necessary system information when broadcasted from node 204 instead. In that case, the previously suggested second connection may be useful after all.

Figure 2:
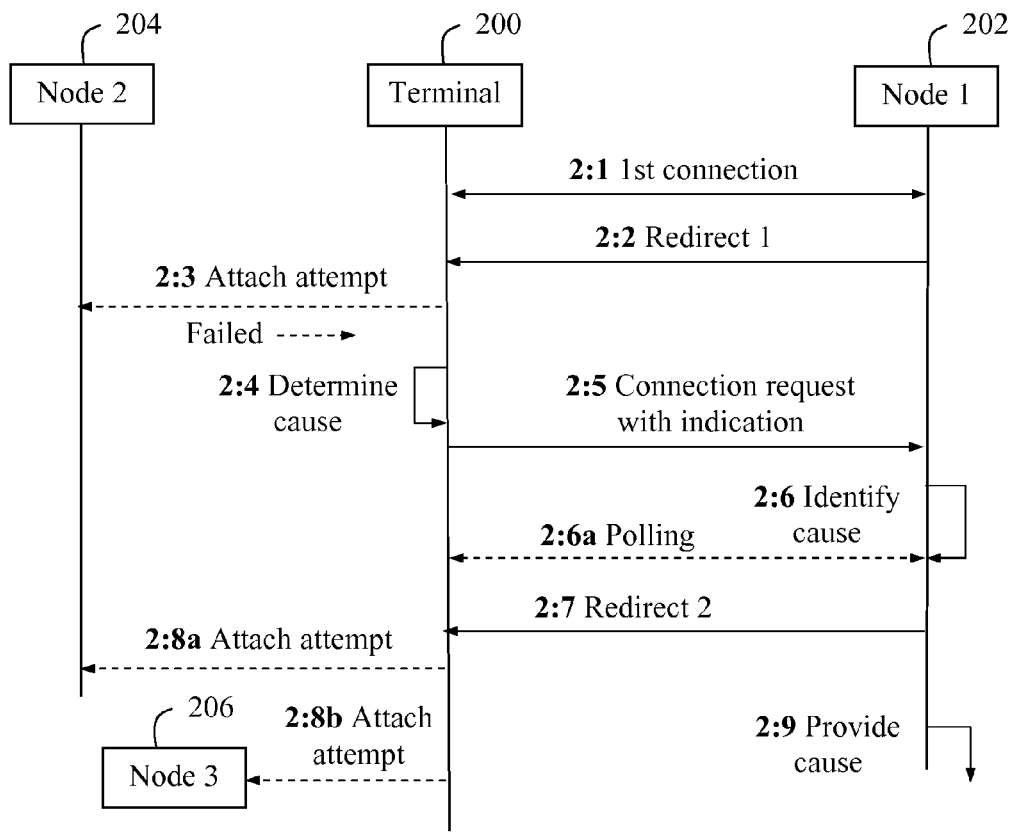
FIG. 2 is a signalling diagram illustrating a procedure for handling shortcomings in a release-with-redirect process, according to an exemplifying embodiment.

In FIG. 2, the terminal's 200 new attach attempt according to the second redirect message of action 2:7 is illustrated as two alternatives, depending on the conclusion made from the identified failure cause. In action 2:8a, the terminal 200 makes an attach attempt to the same node 204 as before but using another frequency or channel, or not using system information in the redirect message. In action 2:8b, the terminal 200 makes an attach attempt to a third node 206, e.g. if no response was received over the second connection or the terminal could not properly attach to the second connection using system information provided by the second connection in action 2:3.

Finally, an action 2:9 illustrates that network node 202 provides the identified failure cause to a network management function, not shown, to enable adaptation of the release-with-redirect process, which may be done e.g. as described above for the long-term usage of this type of information. In this solution, one of actions 2:7 and 2:9 may be omitted although at least one of them is performed by the fast network node 202. For example, it may be too late to send a second redirect message to the terminal 200 if the need for a different connection has expired such as when a new activated service or application, having caused the need for new connection, is inactivated or when network or radio conditions have changed.

The issue of whether system information presented in the first redirect message of action 2:2 is valid or not can be solved in different ways. For example, it may be assumed that this system information was invalid or erroneous in some way if the terminal could not properly attach to the second connection when using that system information. Further, if the terminal "finds" the node 204, e.g. by hearing a broadcast channel or the like therefrom, but uses the system information from the first redirect message, node 204 may not respond to the attach attempt, which thus can be an indication of invalid system information as well, see failure cause 5) above. It is also possible that the first network node 202 can deduce that the system information was invalid if the terminal reports a failure cause according to alternative 1) or 5) above.

An exemplifying procedure will now be described for handling shortcomings when a wireless user terminal currently using a first connection is redirected to a second connection in a release-with-redirect process, with reference to the flow chart in FIG. 3, comprising actions executed by a first network node to which the terminal is initially connected. In a first action 300, the first network node somehow detects that there is a need for a new connection for the terminal currently using the first connection. This need may, as described above, either originate from the terminal if a newly activated service or application requires a new connection, e.g. in terms of service quality, or from the first network node if the performance of its network could be improved by moving the terminal to a new connection, e.g. in terms of cell load or interference.

In a next action 302, the first network node accordingly sends a first redirect message to the terminal with an instruction to attach to the second connection, the latter being predetermined and selected by default in line with the release-with-redirect process, i.e. without evaluation of the current actual connection conditions for the second connection and other potential connections and cells. It is assumed that the terminal follows the instruction to attach to the second connection, which however fails for whatever reason.

At some point, the first network node receives a message from the terminal with a failure indication, in a further action 304, typically shortly after having sent the first redirect message since wireless terminals are generally configured to immediately contact the former network if an attempt to attach to a new connection according to a redirect message fails. The message of action 304 may e.g. be a regular connect request with the failure indication added thereto, although other types of messages are possible too.

In a next action 306, the first network node identifies a cause for the failed attempt made by the terminal to attach to the second connection, by using the received failure indication e.g. as described above. The actions 304 and 306 may be executed e.g. as described for actions 2:5 and 2:6 above, respectively, which are not necessary to repeat here.

It may then be checked in an action 308 if the need for a new connection for the terminal still exists, e.g. by checking whether a service or application having triggered the redirect process has been inactivated. In another example, the previously detected need for a new connection may be deemed outdated according to a preset timeout condition, e.g. counted from the point of detecting the need in action 300, or counted from the point of receiving the message with failure indication from the terminal in action 304.

If the need for new connection is assumed to still exist, the first network node sends a modified second redirect message to the terminal based on the identified cause, in an action 310, e.g. as described for action 2:7 above. The second redirect message is thus created by making use of the acquired knowledge of failure cause. The second redirect message instructs the terminal to attach to a new connection, which could be a third connection or the second connection but without system information, as described above. For example, the second redirect message may suggest a new cell of a third connection different form a cell of the second connection suggested by the first redirect message.

Then, regardless of whether action 310 was performed or not, the first network node may provide information on the identified cause to a network management function, in an action 312, to enable adaptation of the release-with-redirect process, e.g. as described for action 2:9 above. As mentioned above, the network management function may reside in a central Operation and Maintenance (O&M) node or in the receiving network node itself. It is also possible that both the central O&M node and the receiving network node contribute to the adaptation of the release-with-redirect process in a suitable manner.

In this solution, at least one of actions 310 and 312 is performed, thus making use of the identified failure cause. Some examples of activities that the network management function can do using this information were outlined above and are also schematically indicated here by optional actions 314a-c. It should be noted that these activities may be based on such fault reports from multiple wireless terminals having made unsuccessful attempts to follow instructions in redirect messages from their current respective connections. For example, the fact that a particular target or serving cell has repeatedly resulted in failed attach attempts by several terminals, would likely indicate some systematic error in the release-with-redirect process for that cell.

In action 314a, a currently used practice for distribution of system information from a network of the second connection to a network of the first connection, is examined to identify and correct any faults or shortcomings that might result in systematic use of erroneous system information in redirect messages. In action 314b, the availability of a cell of the second connection, is examined e.g. to determine whether a used admission routine or the like should be modified. In action 314c, configurations of one or more cells that may affect or impact the second connection, are examined e.g. to determine whether any cell-specific parameters, algorithms, cell planning or frequency planning need to be modified. Any number or combination of the actions 314a-c may be performed within the scope of this solution.

A procedure, executed by a wireless user terminal, for handling shortcomings in a release-with-redirect process, will now be described with reference to the flow chart of FIG. 4. This terminal may basically operate to conform with the proceedings described above for FIG. 2 and FIG. 3. Accordingly, the terminal currently uses a first connection to a first network node, as shown in a first action 400. In a next action 402, for whatever reason, the terminal receives a first redirect message from the first network node with an instruction to attach to a second connection, which may be needed to provide a sufficient service quality and/or to improve the performance in the network(s) involved.

In response to the first redirect message, the terminal then makes an attempt to attach to the second connection according to the received attach instruction, in a following action 404. If it is determined in an action 406 that the terminal has succeeded to attach to the second connection, i.e. the attach attempt did not fail, the terminal uses the second connection in an action 408. On the other hand, if it is determined in action 406 that the attach attempt of action 404 did fail, the terminal proceeds to determine the cause for the failure in a further action 410, e.g. in the manner described above for action 2:4 in FIG. 2.

For example, the terminal may in this action know, assume or deduce that the cause is, at least potentially, related to at least one of: 1) the terminal could not properly attach to the second connection using system information in the first redirect message, 2) the terminal could not properly attach to the second connection using system information provided by the second connection, 3) system information in the first redirect message was not valid, 4) the terminal was not admitted to the second connection, and 5) the terminal has not received any response over the second connection.

The terminal further sends, in a last shown action 412, a message to a network of the first connection with a failure indication that can be used to identify the cause for the failed attach attempt. In this example, this message is a connection request in which the failure indication is inserted in a suitable manner, e.g. as described above for action 2:5 in FIG. 2. In this action, the terminal may send the message with a failure indication to the first network node or to another node in the network of the first connection, e.g. depending on whether the terminal has moved to another cell since using the first connection.

The terminal may include information in the message of action 412 that more or less explicitly identifies the failure cause, or may send the failure cause to the network of the first connection when polled by the network in response to the failure indication. As described above for action 310 in FIG. 3, the network of the first connection may send another modified redirect message to the terminal with an instruction to attach to a new connection, making use of the acquired knowledge of the failure cause. The network may also make use of the knowledge of failure cause by providing it to a network management function, as of action 312 above, to enable adaptation of the release-with-redirect process.

Figure 4:
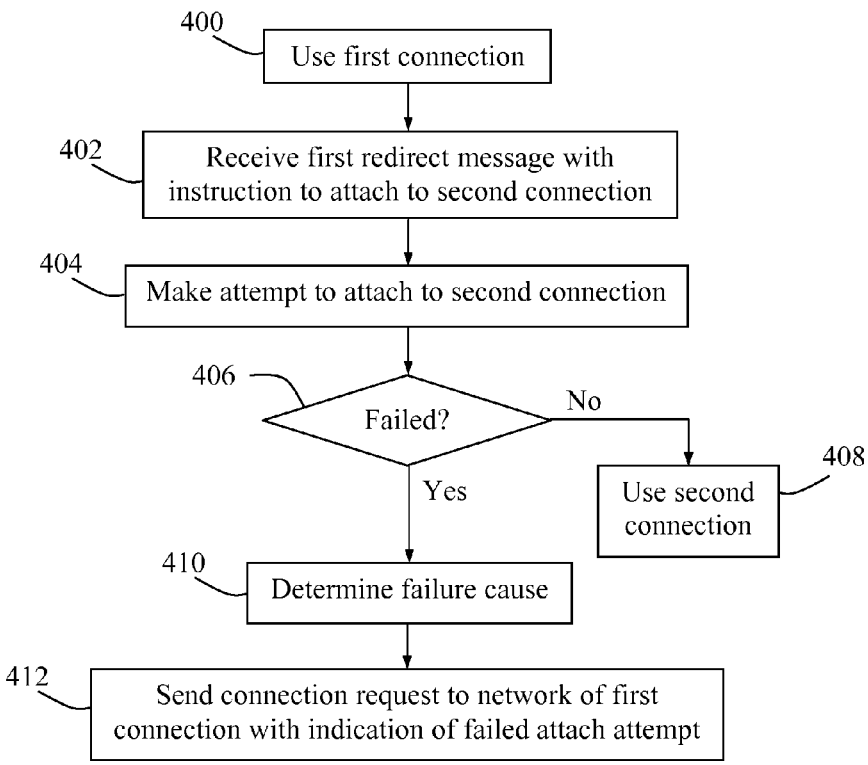
FIG. 4 is a flow chart of a procedure, executed by a user terminal, for handling shortcomings in a release-with-redirect process, according to a further possible embodiment.
Figure 5:
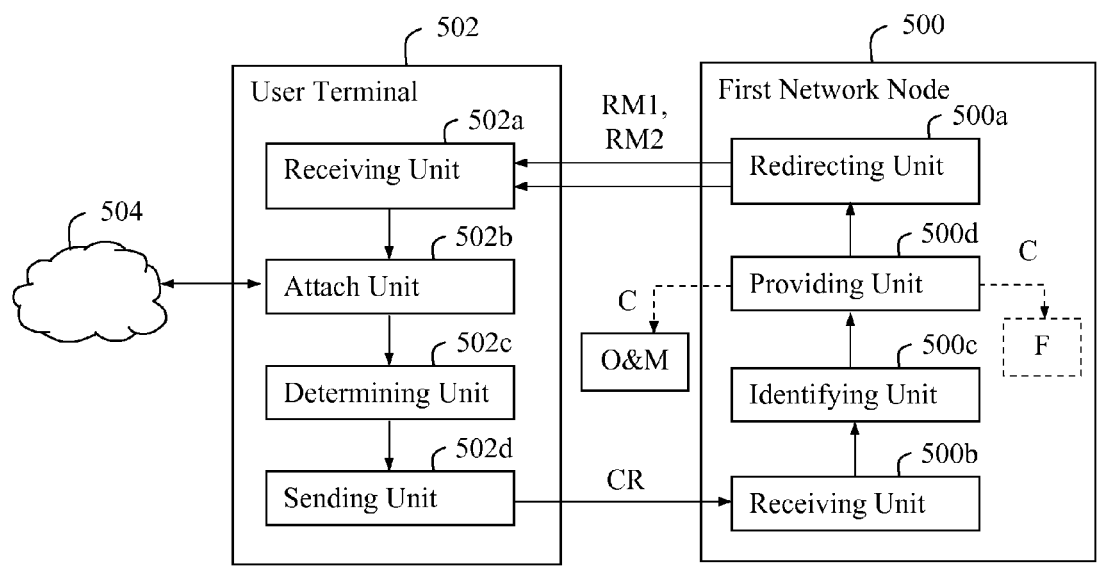
FIG. 5 is a block diagram illustrating exemplifying arrangements in a network node and a user terminal, according to further possible embodiments.

A more detailed but non-limiting example of how arrangements can be implemented in a wireless user terminal and a first network node to accomplish the above-described solution, is illustrated by the block diagram in FIG. 5. Various actions and messages are also schematically indicated in this figure. The first network node 500 and the wireless user terminal 502 are configured to handle shortcomings when the terminal uses a first connection with the network node 500 and is redirected to a second connection 504 in a release-with-redirect process, e.g. in the manner described above for any of FIGS. 2-4.

According to the network arrangement, the first network node 500 comprises a redirecting unit 500a adapted to send a first redirect message "RM1" to the terminal 502 with an instruction to attach to the second connection, e.g. of a shown network 504. The first network node 500 further comprises a receiving unit 500b adapted to receive a message "CR" from the terminal 502 with a failure indication, and an identifying unit 500c adapted to identify a cause for a failed attempt made by the terminal to attach to the second connection, by using the failure indication.

The first network node 500 also comprises a providing unit 500d adapted to provide the identified failure cause "C", e.g. to a central network management function "O&M" and/or to a local adaptation function "F" within the first node 500, to enable adaptation of the release-with-redirect process. The redirecting unit 500a may be further adapted to send a second redirect message "RM2" to the terminal based on the identified failure cause.

According to the terminal arrangement, the wireless user terminal 502 comprises a receiving unit 502a adapted to receive a first redirect message RM1 from the first network node 500, the first redirect message RM1 having an instruction to attach to the second connection e.g. of network 504. The wireless user terminal 502 further comprises an attach unit 502b adapted to make an attempt to attach to the second connection.

If the attach attempt fails, a determining unit 502c in terminal 502 is adapted to determine a cause for the failed attach attempts and a sending unit 502d is adapted to send a message CR to the first network node, or to another node, not shown, in the network of the first connection, with a failure indication that can be used to identify the cause for the failed attach attempt.

It should be noted that FIG. 5 merely illustrates various functional units in the first network node 500 and the terminal 502 in a logical sense, although the skilled person is free to implement these functions in practice using suitable software and hardware means. Thus, the invention is generally not limited to the shown structures of the network node 500 and the terminal 502, while their respective functional units 500a-d and 502a-d may be configured to operate according to the features described for any of FIGS. 2-4 above, where appropriate.

The functional modules 500a-d and 502a-d described above can be implemented in the first network node 500 and the terminal 502 as program modules of respective computer programs, each comprising code means which when run by a processor in each of the first network node 500 and the terminal 502 causes them to perform the above-described functions and actions. Each processor may be a single Central Processing Unit (CPU), or could comprise two or more processing units. For example, the processors may include general purpose microprocessors, instruction set processors and/or related chips sets and/or special purpose microprocessors such as Application Specific Integrated Circuits (ASICs). Each processor may also comprise a memory for caching purposes.

The computer programs may be carried by computer program products in the first network node 500 and the terminal 502 in the form of memories connected to the processors.

Each computer program product or memory comprises a computer readable medium on which the computer program is stored. For example, the memory may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the first network node 500 and the terminal 502.

Figure 3:
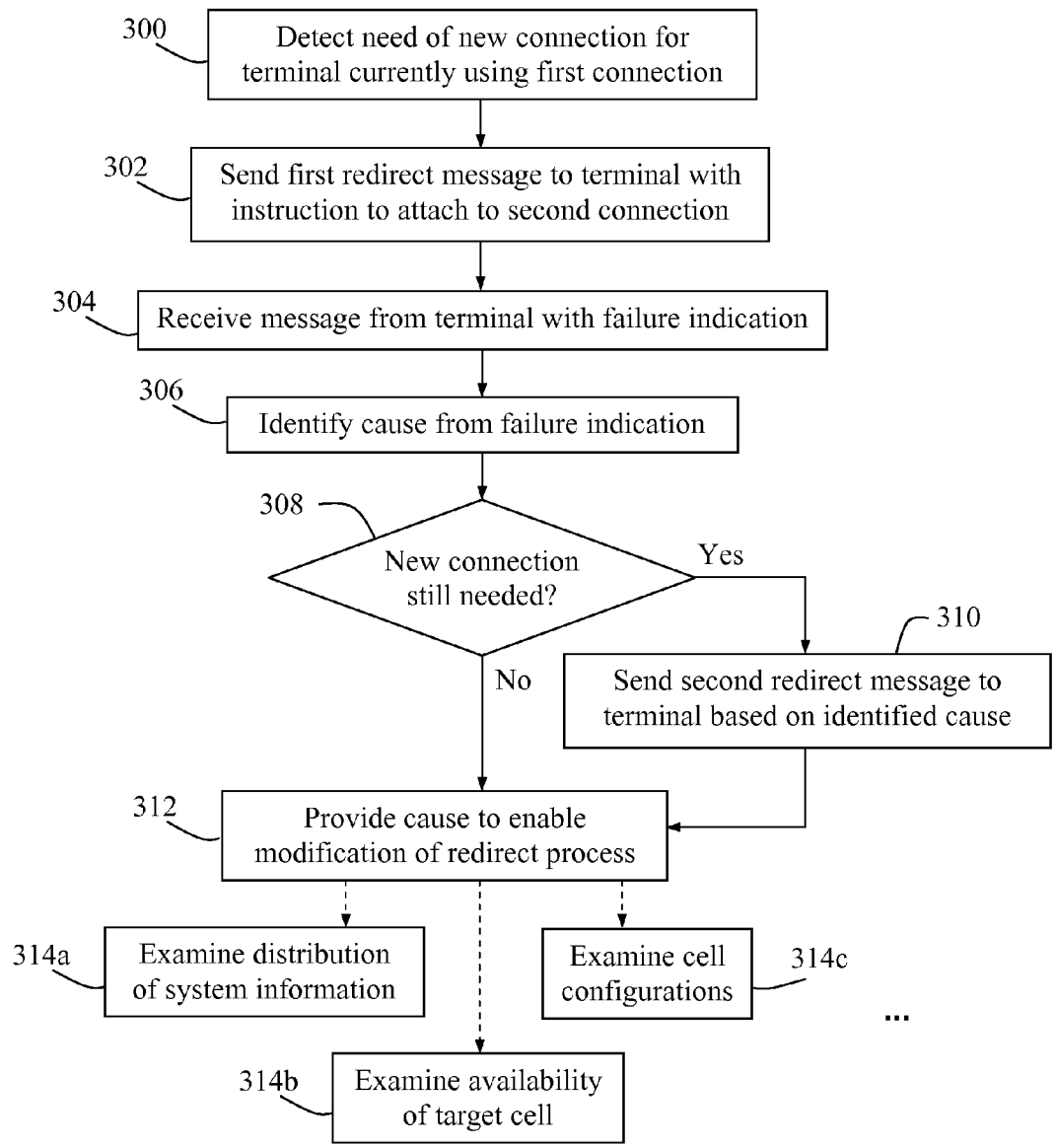
FIG. 3 is a flow chart of a procedure, executed by a network node, for handling shortcomings in a release-with-redirect process, according to another possible embodiment.

The above first network node 500 and the terminal 502 and their functional modules 500a-d and 502a-d can be configured to operate according to various optional embodiments, e.g. in the manner described for FIG. 2 and FIG. 3. For example, the first network node may be adapted to poll the terminal in response to the failure indication, to obtain the cause from the terminal.

Further, the providing unit 500d may be further adapted to provide the identified cause to the network management function to enable at least one of: 1) examining distribution of system information from a network of the second connection to a network of the first connection, 2) examining availability of a cell of the second connection, and 3) examining configurations of one or more cells affecting the second connection.

In another possible embodiment, if it can be deduced from the identified cause that system information in the first redirect message is not valid, the redirecting unit 500a is further adapted to omit the system information from the second redirect message. The second redirect message may suggest a new cell of a third connection different from a cell of the second connection suggested by the first redirect message. The receiving unit 500b may further be adapted to receive the message with a failure indication in a connection request from the terminal.

In the user terminal 502, the sending unit 502d may be further adapted to send the message with the failure indication in a connection request to the network of the first connection. The sending unit 502d may be further adapted to send the cause to the network of the first connection when the terminal is polled by the network in response to the failure indication. The sending unit 502d may also be adapted to send the message with a failure indication to the first network node 500 or to another node, not shown, in the network of the first connection.

The advantages that can be accomplished by the above-described solution include the possibility to adapt and hopefully improve network performance and/or to make more apt redirect instructions so as to increase the chances of successful attach attempts when using the release-with-redirect process.

While the invention has been described with reference to specific exemplary embodiments, the description is generally only intended to illustrate the inventive concept and should not be taken as limiting the scope of the invention. For example, the terms "release-with-direct", "connection", "network node", "user terminal" and "system information" have been used throughout this description, although any other corresponding functions and nodes could also be used having the features and characteristics described here. The invention is defined by the appended claims.

The invention claimed is:

1. A method in a first network node for handling shortcomings when a wireless user terminal using a first connection is redirected to a second connection in a release-with-redirect process, the method comprising:
sending a first redirect message to the terminal with an instruction to attach to the second connection;
receiving a message from the terminal with a failure indication;
identifying a cause for a failed attempt made by the terminal to attach to the second connection, by using said failure indication; and
performing at least one of:
sending a second modified redirect message to the terminal based on the identified cause, wherein the second redirect message is revised from the first redirect message based on the identified cause; and
providing the identified cause to a network management function, to enable adaptation of said release-with-redirect process.

2. The method of claim 1, wherein the message from the terminal includes information indicating that the cause is related to at least one of: 1) the terminal could not properly attach to the second connection using system information in said first redirect message; 2) the terminal could not properly attach to the second connection using system information provided by the second connection; 3) system information in said first redirect message was not valid; 4) the terminal was not admitted to said second connection; and 5) the terminal has not received any response over the second connection.

3. The method of claim 1, wherein the first network node polls the terminal in response to the failure indication, to obtain said cause from the terminal.

4. The method of claim 1, wherein the identified cause is provided to the network management function to enable at least one of: 1) examining distribution of system information from a network of the second connection to a network of the first connection; 2) examining availability of a cell of the second connection; and 3) examining configurations of one or more cells affecting the second connection.

5. The method of claim 1, wherein if it can be deduced from the identified cause that system information in said first redirect message is not valid, said system information is omitted in the second redirect message.

6. The method of claim 1, wherein the second redirect message suggests a new cell of a third connection different from a cell of the second connection suggested by the first redirect message.

7. The method of claim 1, wherein said message with a failure indication is received in a connection request from the terminal.

8. An apparatus in a first network node configured to handle shortcomings when a wireless user terminal using a first connection is redirected to a second connection in a release-with-redirect process, the apparatus comprising:
a redirecting unit adapted to send a first redirect message to the terminal with an instruction to attach to the second connection;
a receiving unit adapted to receive a message from the terminal with a failure indication;
an identifying unit adapted to identify a cause for a failed attempt made by the terminal to attach to the second connection, by using said failure indication; and
a providing unit adapted to provide the identified cause to a network management function, to enable adaptation of said release-with-redirect process.

9. The apparatus of claim 8, wherein the redirecting unit is further adapted to send a second redirect message to the terminal based on the identified cause.

10. The apparatus of claim 8, wherein the message from the terminal includes information indicating that the cause is related to at least one of: 1) the terminal could not properly attach to the second connection using system information in said first redirect message, 2) the terminal could not properly attach to the second connection using system information provided by the second connection, 3) system information in said first redirect message was not valid, 4) the terminal was not admitted to said second connection, and 5) the terminal has not received any response over the second connection.

11. The apparatus of claim 8, wherein the first network node is adapted to poll the terminal in response to the failure indication, to obtain said cause from the terminal.

12. The apparatus of claim 8, wherein the providing unit is further adapted to provide the identified cause to the network management function to enable at least one of: 1) examining distribution of system information from a network of the second connection to a network of the first connection, 2) examining availability of a cell of the second connection, and 3) examining configurations of one or more cells affecting the second connection.

13. The apparatus of claim 9, wherein the redirecting unit is further adapted to omit said system information in the second redirect message if it can be deduced from the identified cause that system information in said first redirect message is not valid.

14. The apparatus of claim 9, wherein the second redirect message suggests a new cell of a third connection different from a cell of the second connection suggested by the first redirect message.

15. The apparatus of claim 8, wherein the receiving unit is further adapted to receive said message with a failure indication in a connection request from the terminal.

16. A method in a user terminal, currently using a first connection to a first network node, for handling shortcomings when being redirected to a second connection in a release-with-redirect process, the method comprising:
  receiving a first redirect message from the first network node with an instruction to attach to the second connection;
  making an attempt to attach to the second connection wherein the attach attempt fails, determining a cause for the failed attach attempt;
  sending a message to a network of the first connection with a failure indication that can be used to identify said cause for the failed attach attempt; and
  receiving a second modified redirect message from the first network node based on the identified cause, wherein the second redirect message is revised from the first redirect message based on the identified cause.

17. The method of claim 16, wherein the message with the failure indication includes information indicating that the cause is related to at least one of: 1) the terminal could not properly attach to the second connection using system information in said first redirect message, 2) the terminal could not properly attach to the second connection using system information provided by the second connection, 3) system information in said first redirect message was not valid, 4) the terminal was not admitted to said second connection, and 5) the terminal has not received any response over the second connection.

18. The method of claim 16, wherein said message with the failure indication is sent in a connection request to the network of the first connection.

19. The method of claim 16, wherein the terminal sends said cause to the network of the first connection when polled by the network in response to the failure indication.

20. The method of claim 16, wherein the terminal sends the message with a failure indication to the first network node or to another node in the network of the first connection.

21. An apparatus in a user terminal, currently using a first connection to a first network node, for handling shortcomings when being redirected to a second connection in a release-with-redirect process, the apparatus comprising:
  a receiving unit adapted to receive a first redirect message from the first network node with an instruction to attach to the second connection;
  an attach unit adapted to make an attempt to attach to the second connection wherein the attach attempt fails;
  a determining unit adapted to determine a cause for the failed attach attempt; and
  a sending unit adapted to send a message to a network of the first connection with a failure indication that can be used to identify said cause for the failed attach attempt;
  wherein the receiving unit is further adapted to receive a second modified redirect message from the first network node based on the identified cause, wherein the second redirect message is revised from the first redirect message based on the identified cause.

22. The apparatus of claim 21, wherein the message with the failure indication includes information indicating that the cause is related to at least one of: 1) the terminal could not properly attach to the second connection using system information in said first redirect message, 2) the terminal could not properly attach to the second connection using system information provided by the second connection, 3) system information in said first redirect message was not valid, 4) the terminal was not admitted to said second connection, and 5) the terminal has not received any response over the second connection.

23. The apparatus of claim 21, wherein the sending unit is further adapted to send said message with the failure indication in a connection request to the network of the first connection.

24. The apparatus of claim 21, wherein the sending unit is further adapted to send said cause to the network of the first connection when the terminal is polled by the network in response to the failure indication.

25. The apparatus of claim 21, wherein the sending unit is further adapted to send the message with a failure indication to the first network node or to another node in the network of the first connection.

* * * * *

UNITED STATES PATENT AND TRADEMARK OFFICE
CERTIFICATE OF CORRECTION

PATENT NO. : 9,307,566 B2
APPLICATION NO. : 13/981003
DATED : April 5, 2016
INVENTOR(S) : André-Jönsson et al.

Page 1 of 1

It is certified that error appears in the above-identified patent and that said Letters Patent is hereby corrected as shown below:

On the Title Page, in Item (57), under "ABSTRACT", in Column 2, Line 5, delete "connection first" and insert -- first --, therefor.

Specification

In Column 5, Line 29, delete "form" and insert -- from --, therefor.

In Column 5, Line 63, delete "release-with-direct" and insert -- release-with-redirect --, therefor.

In Column 7, Line 23, delete "fast" and insert -- first --, therefor.

In Column 7, Line 37, delete "thereform," and insert -- therefrom, --, therefor.

In Column 8, Line 35, delete "form" and insert -- from --, therefor.

In Column 10, Line 36, delete "attempts" and insert -- attempt, --, therefor.

In Column 11, Line 54, delete ""release-with-direct"," and insert -- "release-with-redirect", --, therefor.

Signed and Sealed this
Nineteenth Day of July, 2016

Michelle K. Lee
*Director of the United States Patent and Trademark Office*